(12) United States Patent
Huiqiang

(10) Patent No.: US 11,314,014 B2
(45) Date of Patent: Apr. 26, 2022

(54) GLASS LIGHT-EMITTING TILE

(71) Applicant: Guangdong Shone Lighting Co., Ltd., Guangdong (CN)

(72) Inventor: Zhang Huiqiang, Guangdong (CN)

(73) Assignee: Guangdong Shone Lighting Co., Ltd., Guangdong (CN)

( * ) Notice: Subject to any disclaimer, the term of this patent is extended or adjusted under 35 U.S.C. 154(b) by 0 days.

(21) Appl. No.: 15/882,715

(22) Filed: Jan. 29, 2018

(65) Prior Publication Data

US 2018/0321437 A1 Nov. 8, 2018

(30) Foreign Application Priority Data

May 7, 2017 (CN) .......................... 201720496177.4

(51) Int. Cl.
| | | |
|---|---|---|
| *F21V 8/00* | (2006.01) | |
| *F21V 33/00* | (2006.01) | |
| *E04F 13/074* | (2006.01) | |
| *E04F 15/02* | (2006.01) | |
| *F21Y 115/10* | (2016.01) | |

(52) U.S. Cl.
CPC .......... *G02B 6/0095* (2013.01); *F21V 33/006* (2013.01); *G02B 6/0063* (2013.01); *E04F 13/074* (2013.01); *E04F 15/02183* (2013.01); *E04F 2290/026* (2013.01); *F21Y 2115/10* (2016.08); *G02B 6/0073* (2013.01); *G02B 6/0091* (2013.01)

(58) Field of Classification Search
CPC .... G02B 6/0095; G02B 6/0063; F21V 33/006
See application file for complete search history.

(56) References Cited

U.S. PATENT DOCUMENTS

| | | | | |
|---|---|---|---|---|
| 4,032,751 A | * | 6/1977 | Youtsey ................. | H05B 3/146 |
| | | | | 219/538 |
| 4,921,755 A | * | 5/1990 | Carroll, Jr. ............ | B05D 5/068 |
| | | | | 428/328 |
| 5,896,227 A | * | 4/1999 | Toriumi .................. | B29C 70/74 |
| | | | | 359/536 |

(Continued)

FOREIGN PATENT DOCUMENTS

| | | |
|---|---|---|
| JP | 2014010979 A | 1/2014 |
| JP | 2015141742 A | 8/2015 |
| JP | 2016162508 A | 9/2016 |

OTHER PUBLICATIONS

Extended European Search Report for related EP Application No. 18170289.5, 50 pages, European Patent Office.

*Primary Examiner* — Bryon T Gyllstrom
*Assistant Examiner* — Christopher E Dunay
(74) *Attorney, Agent, or Firm* — Kirby Drake

(57) ABSTRACT

A glass light-emitting tile may include a light-transmissive glass plate, a glass substrate and a light guide plate. The light guide plate may be arranged between the light-transmissive glass plate and the glass substrate. A light-emitting diode (LED) lamp may be provided on a side of the light guide plate. The light-transmissive glass plate and the glass substrate may be glued together using a sealant. The glass light-emitting tile may having a tile and/or a stone-textured coating that may be low cost, may provide a high production efficiency, and may provide flexible customization. The tile may be used indoors and/or outdoors.

7 Claims, 4 Drawing Sheets

(56) References Cited

U.S. PATENT DOCUMENTS

| | | | | |
|---|---|---|---|---|
| 6,270,616 | B1* | 8/2001 | Punsly | C09J 163/00 |
| | | | | 156/330 |
| 10,101,521 | B1* | 10/2018 | Burgio, Jr. | G02B 6/0095 |
| 2003/0138639 | A1* | 7/2003 | Setten | B32B 17/06 |
| | | | | 428/426 |
| 2004/0004827 | A1* | 1/2004 | Guest | G02B 6/0091 |
| | | | | 362/612 |
| 2007/0098969 | A1* | 5/2007 | Ansems | B32B 17/10036 |
| | | | | 428/212 |
| 2008/0037284 | A1* | 2/2008 | Rudisill | F21S 2/005 |
| | | | | 362/629 |
| 2014/0104882 | A1* | 4/2014 | Zhou | G02B 6/0088 |
| | | | | 362/612 |
| 2015/0241052 | A1* | 8/2015 | Furmanek | F21V 33/006 |
| | | | | 362/145 |

* cited by examiner

US 11,314,014 B2

GLASS LIGHT-EMITTING TILE

CROSS-REFERENCE TO RELATED APPLICATIONS

The present application hereby claims priority to Chinese Patent Application No. 2017204961774, filed on May 7, 2017, entitled "GLASS LIGHT-EMITTING TILE" which is incorporated herein by reference in its entirety.

TECHNICAL FIELD

The disclosure relates generally to light-emitting tiles and, in particular, to a glass light-emitting tile.

BACKGROUND

Currently, existing light-emitting tiles can be composed of a light-transmissive plate, a lamp housing, and a light-emitting diode (LED) lamp. The lamp housing can primarily be made of stainless steel. The light-transmissive plate and lamp housing of conventional light-emitting tiles can include two separated structures, and the overall appearance can appear to have the effect of or appear to be one lamp.

SUMMARY

Embodiments of the present disclosure may provide a glass-light-emitting tile that may include a light-transmissive glass plate affixed to a glass substrate and a light guide plate. The light guide plate may be arranged between the light-transmissive glass plate and the glass substrate. A light-emitting diode (LED) lamp may be provided on a side of the light guide plate. The light-transmissive glass plate and the glass substrate may be glued together using a sealant. An upper surface of the light-transmissive glass plate may provide a tile-textured coating or a stone-textured coating, and the tile-textured coating or the stone-textured coating may be melted into the glass substrate at a high temperature. A lower surface of the glass substrate may provide a tile-textured coating or a stone-textured coating, and the tile-textured coating or the stone-textured coating may be melted into the glass substrate at a high temperature. A metallic flake may be provided on an exterior of the sealant, and the metallic flake may be adhered and fixed on the sealant. A corner brace of a wrap angle may be provided at the junction of the metallic flake. A plurality of notches may be engaged with the corner brace of the wrap angle, and the plurality of notches may be provided at opposite ends of the metallic flake. The corner brace of the wrap angle and the metallic flake may form a plane on an exterior of the sealant. The metallic flake may be provided on the exterior of the sealant. The light guide plate and the LED lamp may be integrated and form a lamp module.

Other technical features may be readily apparent to one skilled in the art from the following drawings, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure generally provides a glass light-emitting tile that may be made of a light-transmissive glass plate. The tile may include a glass substrate, a light guide plate, and a light-emitting diode (LED) lamp that may be integrated to form a lamp module.

Figure 1:
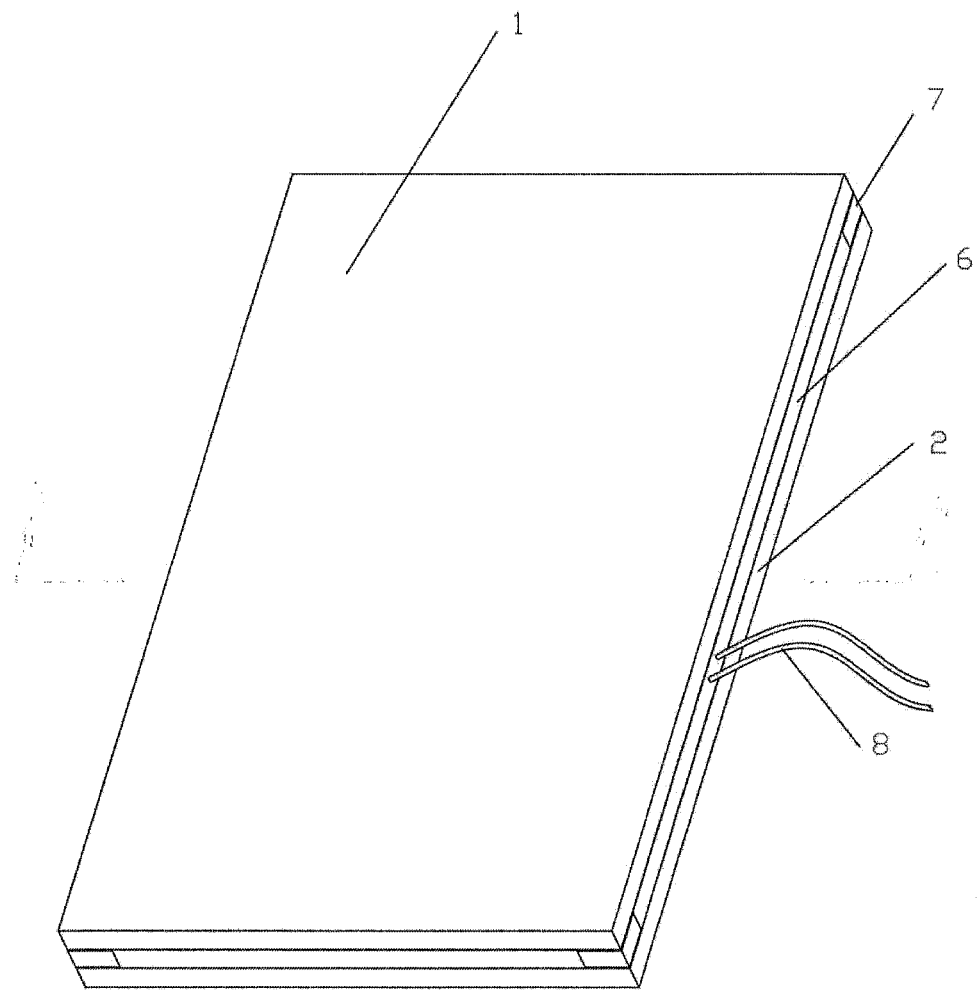
FIG. 1 depicts a stereoscopic structure of a glass light-emitting tile according to an embodiment of the present disclosure.
Figure 2:
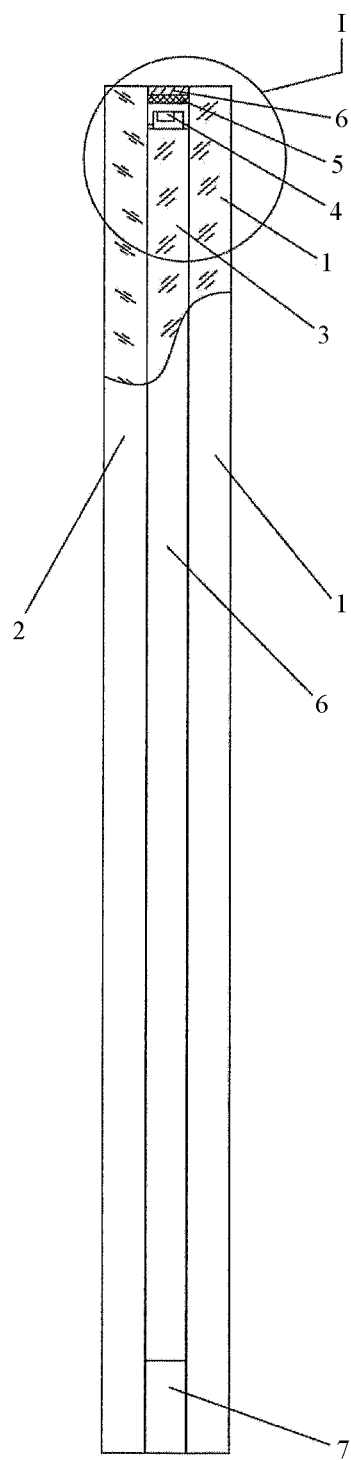
FIG. 2 depicts a partial cross-sectional view, I, of the glass light-emitting tile of FIG. 1 according to an embodiment of the present disclosure.
Figure 3:
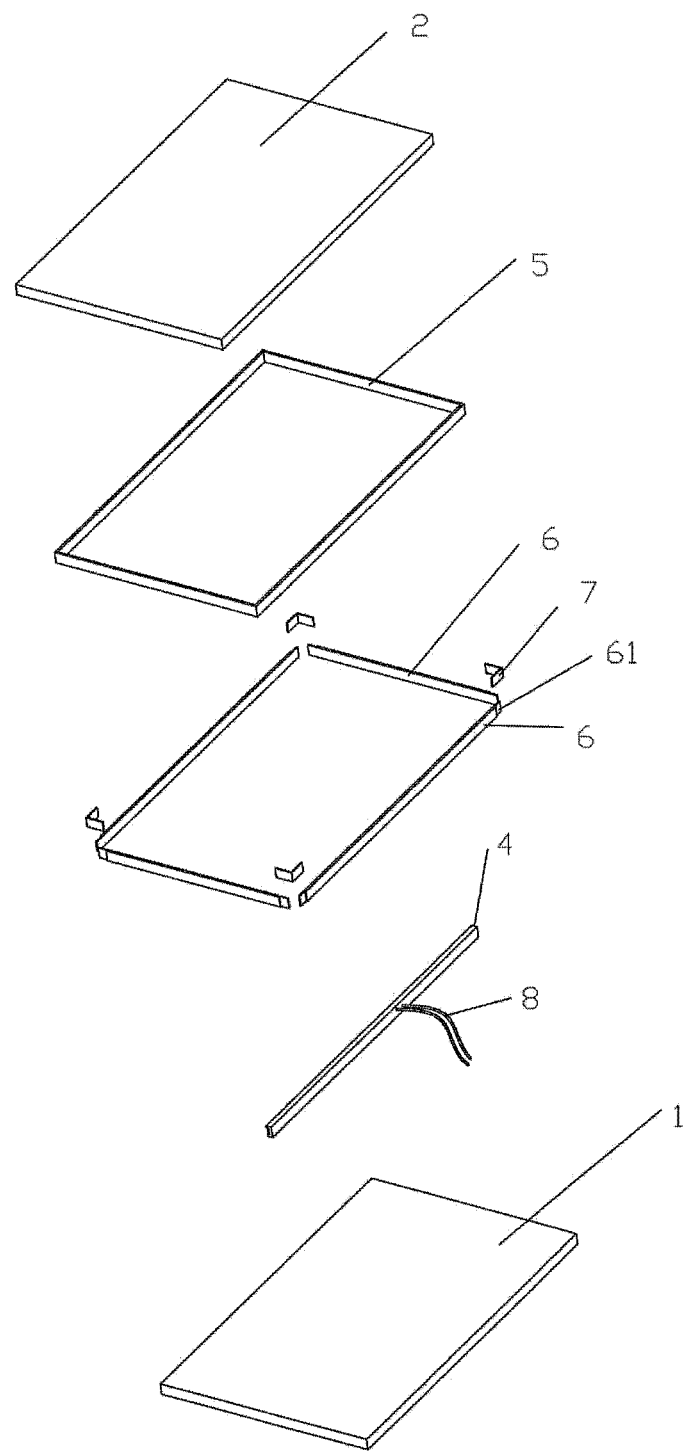
FIG. 3 depicts an exploded view of the glass light-emitting tile of FIG. 1 according to an embodiment of the present disclosure.
Figure 4:
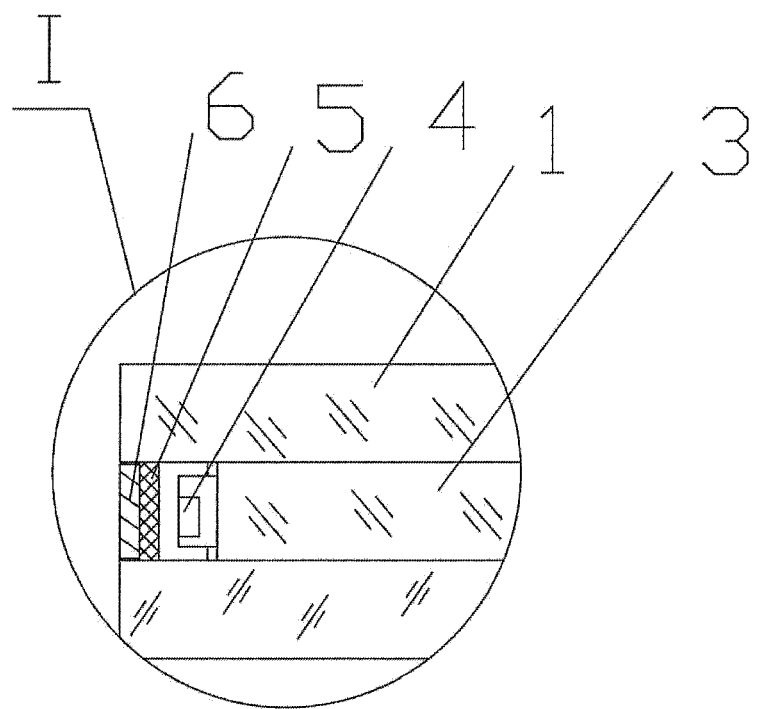
FIG. 4 depicts an enlarged view of the partial cross-sectional view, I, of the glass light-emitting tile of FIG. 2 according to an embodiment of the present disclosure.

FIGS. 1, 2, 3 and 4 depict a glass light-emitting tile that may include light-transmissive glass plate 1, glass substrate 2 (FIGS. 1-3), and light guide plate 3 (FIGS. 2 and 4). Light guide plate 3 may be arranged between light-transmissive glass plate 1 and glass substrate 2. Light-emitting diode (LED) lamp 4 (FIGS. 2-4) may be provided on a side of light guide plate 3. Light-transmissive glass plate 1 and glass substrate 2 may be glued together using sealant 5 (FIGS. 2-4). LED lamp 4 may be connected to lead 8 (FIGS. 1 and 3) that may connect to an external power source. An upper surface of light-transmissive glass plate 1 and a lower surface of glass substrate 2 may be provided with a tile-textured coating and/or a stone-textured coating that may be melted into the glass substrate at a high temperature.

Glass light-emitting tiles may be coordinated with the surrounding environment and may have soft light and uniform light transmission in embodiments of the present disclosure. No dark area(s) may exist, and no dark area(s) may be connected between light-emitting tiles in embodiments of the present disclosure. It should be appreciated that a wear-resistant coating may be provided in some embodiments of the present disclosure.

Metallic flake 6 may be provided on the outside of sealant 5 (FIGS. 2-4), and metallic flake 6 may be adhered and fixed on sealant 5. A corner brace of wrap angle 7 (FIGS. 1-3) may be provided at a junction of metallic flake 6. Notches 61 (FIG. 3) may be engaged with the corner brace of wrap angle 7 that may be provided at both ends of metallic flake 6, such that the corner brace of wrap angle 7 and metallic flake 6 form a plane on an exterior of the junction. Light guide plate 3 (FIGS. 2 and 4) and LED lamp 4 may be integrated to form a lamp module. Light guide plate 3 and the LED lamp 4 may form an overall lamp module that may quickly complete the installation of a light-emitting panel that may further improve production efficiency.

FIGS. 1-4 depict a glass light-emitting tile according to embodiments of the present disclosure that may be made entirely of light-transmissive glass plate 1, light guide plate 3, and glass substrate 2 (FIGS. 1-3). Light-emitting diode (LED) lamp 4 (FIGS. 2-4) may be provided on a side of light guide plate 3. Light-transmissive glass plate 1 and glass substrate 2 may be glued together using sealant 5 (FIGS. 2-4).

Only light-transmissive glass plate 1 and glass substrate 2 (FIGS. 1-3) may be seen when viewing the exterior of the entire tile in embodiments of the present disclosure, and the overall appearance of the entire tile may be a one-piece tile/stone-textured light-emitting glass tile. It should be appreciated that glass substrate 2 may replace the traditional stainless steel lamp housing and may enable dual-sided light emission. It should also be appreciated that glass substrate 2 may greatly reduces the cost of light-emitting tiles. Light guide plate 3 (FIGS. 2 and 4) and LED lamp 4 (FIGS. 2-4) may be processed and assembled into a whole or single component. It should be appreciated that the glass light-emitting tile according to embodiments of the present disclosure may be constructed in a relatively simple manner, and production efficiency of light-emitting tiles may be improved compared to conventional tiles. It should be appreciated that glass light-emitting tiles may be waterproof and utilized in indoor and/or outdoor environments in embodiments of the present disclosure. It should also be appreciated that glass light-emitting tiles according to embodiments of the present disclosure may be utilized for applications including, but not limited to, landscape floor lighting, wall decorating, lighting stairs, upstands in kitchens, and backsplash in bathrooms.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A glass light-emitting tile comprising:
   a light-transmissive glass plate;
   a glass substrate disposed adjacent to the light-transmissive glass plate;
   a light guide plate arranged between the light-transmissive glass plate and the glass substrate, wherein the two largest dimensions of the light guide plate are smaller than the two largest dimensions of the light-transmissive glass plate and the glass substrate such that a plurality of recesses are formed around the light-emitting tile at side edges of the light guide plate and between the light-transmissive glass plate and the glass substrate; and
   a light-emitting diode (LED) lamp provided on a side of the light guide plate within one of the recesses of the plurality of recesses,
   wherein a sealant fills the plurality of recesses and affixes the light-transmissive glass plate to the glass substrate such that only the light-transmissive glass plate, the glass substrate, and the sealant are visible when viewing an exterior of the tile.

2. The glass light-emitting tile according to claim 1, wherein a surface of the light-transmissive glass plate facing away from the glass substrate provides a tile-textured coating or a stone-textured coating, and wherein the tile-textured coating or the stone-textured coating is melted into the glass substrate at a high temperature.

3. The glass light-emitting tile according to claim 1, wherein a surface of the glass substrate facing away from the light-transmissive glass provides a tile-textured coating or a stone-textured coating, and wherein the tile-textured coating or the stone-textured coating is melted into the glass substrate at a high temperature.

4. The glass light-emitting tile according to claim 1, wherein a metallic flake is provided on a surface of the sealant facing away from the light-transmissive glass plate and the glass substrate, and wherein the metallic flake is adhered and fixed on the sealant.

5. The glass light-emitting tile according to claim 4, wherein a corner brace of a wrap angle is provided at the junction of the metallic flake.

6. The glass light-emitting tile according to claim 5, further comprising:
   a plurality of notches engaged with the corner brace of the wrap angle, the plurality of notches provided at opposite ends of the metallic flake, wherein the corner brace of the wrap angle and the metallic flake form a plane on a surface of the sealant facing away from the light-transmissive glass plate and the glass substrate, and wherein the metallic flake is provided on the surface of the sealant facing away from the light-transmissive glass plate and the glass substrate.

7. The glass light-emitting tile according to claim 1, wherein the light guide plate and the LED lamp are integrated and form a lamp module.

* * * * *